United States Patent
Akamatsu

(10) Patent No.: US 12,095,091 B2
(45) Date of Patent: Sep. 17, 2024

(54) BINDER FOR NON-AQUEOUS SECONDARY BATTERY AND DISPERSION THEREOF

(71) Applicant: TEIJIN LIMITED, Osaka (JP)

(72) Inventor: Tetsuya Akamatsu, Osaka (JP)

(73) Assignee: TEIJIN LIMITED, Osaka (JP)

( * ) Notice: Subject to any disclaimer, the term of this patent is extended or adjusted under 35 U.S.C. 154(b) by 766 days.

(21) Appl. No.: 16/973,664

(22) PCT Filed: Jun. 28, 2019

(86) PCT No.: PCT/JP2019/025896
§ 371 (c)(1),
(2) Date: Dec. 9, 2020

(87) PCT Pub. No.: WO2020/012990
PCT Pub. Date: Jan. 16, 2020

(65) Prior Publication Data
US 2021/0194006 A1 Jun. 24, 2021

(30) Foreign Application Priority Data
Jul. 10, 2018 (JP) .................................. 2018-130482

(51) Int. Cl.
| | |
|---|---|
| H01M 4/62 | (2006.01) |
| H01M 10/0525 | (2010.01) |
| H01M 50/423 | (2021.01) |
| H01M 50/443 | (2021.01) |
| H01M 50/446 | (2021.01) |
| H01M 50/449 | (2021.01) |

(52) U.S. Cl.
CPC ....... *H01M 4/622* (2013.01); *H01M 10/0525* (2013.01); *H01M 50/423* (2021.01); *H01M 50/443* (2021.01); *H01M 50/446* (2021.01); *H01M 50/449* (2021.01)

(58) Field of Classification Search
CPC ............. H01M 4/622; H01M 10/0525; H01M 50/423; H01M 50/443; H01M 50/446; H01M 50/449; H01M 50/403; H01M 50/44; H01M 4/0404; H01M 4/13; H01M 4/139; H01M 50/451; H01M 4/0416; H01M 4/0471; H01M 50/414; H01M 50/431; Y02E 60/10; Y02P 70/50
USPC ......................................................... 429/144
See application file for complete search history.

(56) References Cited

U.S. PATENT DOCUMENTS

| | | |
|---|---|---|
| 5,723,568 A | 3/1998 | Shimada et al. |
| 6,280,843 B1 | 8/2001 | Murayama et al. |
| 2012/0189897 A1 | 7/2012 | Wakizaka et al. |
| 2012/0258351 A1 | 10/2012 | Saka et al. |
| 2017/0294637 A1 | 10/2017 | Sato et al. |
| 2019/0044118 A1* | 2/2019 | Sakurai ............... H01M 50/417 |

FOREIGN PATENT DOCUMENTS

| | | | |
|---|---|---|---|
| JP | 08-319420 A | 12/1996 | |
| JP | 2000-054224 A | 2/2000 | |
| JP | 2006-269305 A | 10/2006 | |
| JP | 2007-158163 A | 6/2007 | |
| JP | 2007158163 * | 6/2007 | |
| JP | 2007-305574 A | 11/2007 | |
| JP | 4416232 B2 * | 2/2010 | .............. H01M 4/13 |
| JP | 2011-129410 A | 6/2011 | |
| JP | 2012-067425 A | 4/2012 | |
| JP | 2012-142244 A | 7/2012 | |
| JP | 2012-209181 A | 10/2012 | |
| JP | 2013-200965 A | 10/2013 | |
| JP | 2016-171056 A | 9/2016 | |
| KR | 10-2009-0081393 A | 7/2009 | |
| WO | 2007/125712 A1 | 11/2007 | |
| WO | 2008/013247 A1 | 1/2008 | |
| WO | 2011/040562 A1 | 4/2011 | |

OTHER PUBLICATIONS

JP2007158163 as taught by Makoto (Year: 2007).*
English translation of JP4416232B2 as taught by Fuse; JP-2001143698 used as equivalent english translation (Year: 2001).*
Written Opinion of the International Searching Authority and International Preliminary Report on Patentability for PCT/JP2019/025896 dated Sep. 24, 2019.
European Search Report dated May 19, 2021 in Application No. 19833164.7.
Office Action dated Sep. 5, 2022 in Korean Patent Application No. 10-2021-7003654.
International Search Report for PCT/JP2019/025896 dated Sep. 24, 2019 [PCT/ISA/210].

* cited by examiner

*Primary Examiner* — Jonathan G Jelsma
*Assistant Examiner* — Omar M Kekia
(74) *Attorney, Agent, or Firm* — Sughrue Mion, PLLC

(57) ABSTRACT

Provided is a binder for use in an electrode layer or separator for a lithium-ion secondary battery, wherein the binder is unlikely to cause powder removal and does not completely cover the surface of the active material particles when used in an electrode layer as a binder. The binder of the present invention is a binder for a non-aqueous secondary battery, the binder comprising a fibrid of an aromatic polyamide, wherein the fibrid swells and is not dissolved in an N-methyl-2-pyrrolidone solvent in which an alkali metal salt and/or an alkaline earth metal salt is present at a concentration of 1,000 ppm or less, and is completely dissolved in an N-methyl-2-pyrrolidone solvent in which an alkali metal salt and/or an alkaline earth metal salt is present at a concentration of 10,000 ppm or more.

12 Claims, No Drawings

BINDER FOR NON-AQUEOUS SECONDARY BATTERY AND DISPERSION THEREOF

TECHNICAL FIELD

The present invention relates to a binder for use in a non-aqueous secondary battery and a dispersion thereof, an electrode and a separator each using the same, and a method for producing the same.

BACKGROUND ART

Non-aqueous secondary batteries, particularly so-called lithium-ion secondary batteries (hereinafter, frequently referred to as "LiBs") using a lithium oxide in a positive electrode have excellent capacity and output characteristics and are widely used.

With respect to LiBs for electric vehicle for which demand is expected to be increased, various demands are made on the LiBs wherein they should have a large capacity and be unlikely to be reduced in the capacity for a long term, and should have high safety even when vigorous heat generation occurs due to short-circuiting between the positive electrode and the negative electrode, and moisture can be removed even at high temperatures.

For meeting these demands, a variety of techniques have been proposed. For example, JP-A-2012-142244 has proposed the use of copolymerized meta-aramid as a binder for an electrode layer and the formation of an electrode layer by mixing the copolymerized meta-aramid dissolved in NMP with active material particles and applying the resultant mixture to a current collector. However, in this technique, the copolymerized meta-aramid is used in the form of being dissolved in a solvent, and therefore a problem arises in that the surface of the active material particles is disadvantageously covered with the binder. Further, the binder in an amorphous state such that the polymer chains are not oriented is fixed onto the current collector, and therefore it is impossible to obtain an electrode layer having such durability that the electrode layer is satisfactorily durable when suffering expansion and shrinkage caused due to adsorption and desorption of Li ions.

JP-A-2007-158163 has a description that a fibrid of para-aramid and active material particles are dispersed in water to form a slurry and the slurry is subjected to wet paper making to obtain a sheet for an electrode layer. The fibrid used in this technique is excellent in respect of the fact that it is possible to form an electrode layer having such strength that the electrode layer is satisfactorily durable when suffering expansion and shrinkage caused due to adsorption and desorption of Li ions; however, removal of the fibrid in a powdery form (powder removal) from the electrode layer disadvantageously occurs.

International Patent Application Publication No. 2008/013247 has proposed a method in which a fibrid of meta-aramid and active material particles are dispersed in water to form a slurry, and the slurry is applied onto a current collector and dried, and then hot-pressed to the current collector to form an electrode layer. However, it is difficult for this method to satisfactorily suppress the occurrence of powder removal.

Further, International Patent Application Publication No. 2007/125712 has a description that an NMP solution of meta-aramid is applied onto a current collector and dried, and then hot-pressed to the current collector to form an electrode layer.

PTL 1: JP-A-2012-142244
PTL 2: JP-A-2007-158163
PTL 3: International Patent Application Publication No. 2008/013247
PTL 4: International Patent Application Publication No. 2007/125712

DISCLOSURE OF INVENTION

Technical Problem

The present invention has been made to solve the above-mentioned problems accompanying conventional techniques. A task of the present invention is to provide a binder for use in an electrode layer or separator for a lithium-ion secondary battery, wherein the binder is unlikely to cause powder removal. Another task of the invention is to provide a binder which is unlikely to cause powder removal, and which does not completely cover the surface of the active material particles when used in an electrode layer as a binder.

Solution to Problem

The present inventor has conducted studies with a view toward solving the above-mentioned problems. As a result, it has been found that, by using as a binder a fibrid of an aromatic polyamide which swells with an aprotic polar solvent and which is not dissolved in an aprotic polar solvent, the particles used together with the binder can be fixed to a fine three-dimensional network structure of the binder in such a state that the surface of the particles is not completely covered with the binder. Further, it has been found that the fibrid which has swollen with an aprotic polar solvent is dried and desolvated on the surface of an electrode layer or a separator so that they are strongly bound together, making it possible to form an electrode layer or separator which is unlikely to cause powder removal.

Specifically, the present invention is a binder for a non-aqueous secondary battery, the binder comprising a fibrid of an aromatic polyamide, wherein the fibrid swells and is not dissolved in an N-methyl-2-pyrrolidone solvent in which an alkali metal salt and/or an alkaline earth metal salt is present at a concentration of 1,000 ppm or less, and is completely dissolved in an N-methyl-2-pyrrolidone solvent in which an alkali metal salt and/or an alkaline earth metal salt is present at a concentration of 10,000 ppm or more.

In the invention, the fibrid of the aromatic polyamide constitutes 10% by weight or more, preferably 30% by weight or more, further preferably 50% by weight or more of the binder. An especially preferred embodiment of the invention is a binder for a non-aqueous secondary battery, the binder comprising a fibrid of an aromatic polyamide, wherein the fibrid swells and is not dissolved in an N-methyl-2-pyrrolidone solvent in which an alkali metal salt and/or an alkaline earth metal salt is present at a concentration of 1,000 ppm or less, and is completely dissolved in an N-methyl-2-pyrrolidone solvent in which an alkali metal salt and/or an alkaline earth metal salt is present at a concentration of 10,000 ppm or more.

The second invention of the present invention is an electrode for a lithium-ion secondary battery, which comprises a current collector, and an electrode layer being supported on one surface or both surfaces of the current collector and containing active material particles, wherein the electrode layer contains the active material particles and the binder of the invention.

The third invention of the present invention is a separator for a lithium-ion secondary battery, which comprises a substrate, and the binder of the invention present on the surface of the substrate.

Advantageous Effects of Invention

In the invention, there can be provided a binder for use in an electrode layer or separator for a lithium-ion secondary battery, wherein the binder is unlikely to cause powder removal. Further, in the invention, there can be provided a binder which is unlikely to cause powder removal, and which does not completely cover the surface of the active material particles when used in an electrode layer as a binder.

BEST MODE FOR CARRYING OUT THE INVENTION

<Binder>

The fibrid in the binder of the invention has a feature that the fibrid swells and is not dissolved in an N-methyl-2-pyrrolidone solvent in which an alkali metal salt and/or an alkaline earth metal salt is present at a concentration of 1,000 ppm or less, and is completely dissolved in an N-methyl-2-pyrrolidone solvent in which an alkali metal salt and/or an alkaline earth metal salt is present at a concentration of 10,000 ppm or more.

When a fibrid which is dissolved in an N-methyl-2-pyrrolidone solvent in which an alkali metal salt and/or an alkaline earth metal salt is present at a concentration of 1,000 ppm or less is used as a binder, the active material particles for an electrode cannot be fixed with a nanonetwork structure of the fibrid of an aromatic polyamide. Meanwhile, when a fibrid which does not swell in such a solvent is used as a binder, binding of one fibrid with another is reduced, so that the strength of the electrode layer is lowered or the adhesion with the current collector is lowered.

When a fibrid which is incompletely dissolved in an N-methyl-2-pyrrolidone solvent in which an alkali metal salt and/or an alkaline earth metal salt is present at a concentration of 10,000 ppm or more is used as a binder, the binder is in substantially the same state as the state of a fibrid of a water-insoluble polymer dispersed in water, and an electrode layer or separator using such a binder causes powder removal.

The method for determining the state of the swelling and solution of the fibrid (whether the fibrid is "not dissolved" or "completely dissolved") is provided in the item "(1) Solubility" shown in the Examples below.

With respect to the fibrid in the binder of the invention having the above-mentioned feature for the behavior of the aromatic polyamide in N-methyl-2-pyrrolidone, among the fibrids of aromatic polyamide, one having the above-mentioned feature is selected and used. Specifically, a fibrid of a copolymer of copolymerized polyparapheneylterephthalamide has the above-mentioned feature.

With respect to the copolymerized polyparapheneyl-terephthalamide which is the fibrid having the above-mentioned feature, a copolymer having a paraphenyleneterephthalamide structure in the polymer chain thereof and having 3,4'-oxydiphenylenediamine or 4,4'-oxydiphenylenediamine copolymerized as a copolymerized diamine component is preferably used.

In these copolymers, the proportion of 3,4'-oxydiphenylenediamine or 4,4-oxydiphenylenediamine in the all diamine components is 10 to 75 mol %, preferably 25 to 75 mol %, further preferably 30 to 70 mol %. When the proportion is less than 10 mol %, the fibrid is disadvantageously dissolved in an N-methyl-2-pyrrolidone solvent in which an alkali metal salt and/or an alkaline earth metal salt is present at a concentration of 1,000 ppm or less. On the other hand, when the proportion is more than 75 mol %, the fibrid does not swell in an N-methyl-2-pyrrolidone solvent in which an alkali metal salt and/or an alkaline earth metal salt is present at a concentration of 1,000 ppm or less, and therefore such a fibrid is not suitable for a binder for a non-aqueous secondary battery.

The binder of the invention is used in the form of a fibrid which is dispersed in an aprotic polar solvent. The fibrid is fine fibrous particles having paper making properties, preferably small leaves in a tissue form or a scale form having very small fibrils, or a micro-short fiber which is randomly fibrillated. The micro-short fiber is preferably in a form such that a crystal structure of the fiber is not firmly formed and the fiber is in an amorphous state and water molecules or moisture is present in the crystal structure.

The fibrid has an average fiber diameter of 5 to 1,000 nm, preferably 10 to 500 nm, further preferably 10 to 100 nm. When the average fiber diameter of the fibrid is less than 5 nm, the viscosity of the dispersion of the binder disadvantageously becomes excessively high, so that a problem of skips or the like is likely to occur during the application of the dispersion to a current collector, and there is a need to reduce the binder ratio, causing the adhesion with the current collector to be unsatisfactory. On the other hand, when the average fiber diameter of the fibrid is more than 1,000 nm, the network comprised of the binder disadvantageously becomes coarse, so that powder removal is likely to occur.

The fibrid preferably has an average fiber length of 10 to 2,000 μm, further preferably 50 to 1,000 μm. When the average fiber length of the fibrid is in the above range, uniformity of the coating film during the application can be maintained without lowering the strength of the network of the fibrid, and the generation of interlocking of the fibrid is suppressed, so that the active material particles for an electrode can be effectively supported on the network of the fibrid. By using the fibrid having an average fiber length in the above range, the fibrid does not completely cover the surface of the active material particles for an electrode, making it possible to support the active material particles on a current collector.

<Dispersion of the Binder>

In a LiB, when chloride ions are present, the movement of Li ions is inhibited or the current collector suffers corrosion. Therefore, in a LiB, the chloride ion concentration is generally maintained at 500 ppm or less, preferably 100 ppm or less, further preferably 10 ppm or less. In an aprotic polar solvent having a chloride ion concentration in the above-mentioned range for a LiB, the binder of the invention is strongly bound together and maintains a gel form without being dissolved in the aprotic polar solvent.

The binder of the invention is used in the form of a dispersion having the binder dispersed in an aprotic polar solvent having a chloride ion concentration of, for example, 500 ppm or less, preferably 100 ppm or less, further preferably 10 ppm or less. In the dispersion, the fibrid in the binder of the invention has swollen with the aprotic polar solvent.

As the aprotic polar solvent, for example, N-methyl-2-pyrrolidone (NMP), N,N-dimethylformamide, N,N-dimethylacetamide (DMAC), or dimethyl sulfoxide (DMSO) can be used, and N-methyl-2-pyrrolidone (NMP) is preferably used.

Dispersing can be performed using a generally known high-speed mixer which can apply a high shear. In the dispersion, the ratio of the binder and the aprotic polar solvent, in terms of a weight ratio, is, for example, 1:99 to 10:90.

<Composition for Forming an Electrode Layer>

The invention is also a composition for forming an electrode layer for a non-aqueous secondary battery, which contains the above-mentioned binder in an amount of 0.1 to 20% by weight, preferably 1 to 10% by weight, further preferably 1 to 5% by weight, and further contains active material particles and conductivity imparting auxiliary particles.

In the formed electrode layer, the smaller the amount of the binder contained, the larger the amount of the active material particles contained. Therefore, the amount of the binder is preferably smaller from the viewpoint of improving the LiB capacity, but, when the amount of the binder is too small, it is difficult to fix the active material particles onto a current collector. Therefore, it is necessary that the composition for forming an electrode layer contain the binder in an amount of at least 0.1% by weight. On the other hand, when the amount of the binder is more than 20% by weight, the amount of the active material particles contained is reduced, so that an effect of improving the LiB capacity cannot be achieved.

The amount of the active material particles contained in the composition for forming an electrode layer is, for example, 70 to 99.8% by weight, preferably 80 to 98% by weight, further preferably 90 to 98% by weight. When the amount of the active material particles contained is in the above range, all the capacity of the battery and the strength of the electrode layer as well as the uniformity of the coating film for the electrode layer can be achieved.

The conductivity imparting auxiliary particles may be contained or may not be contained in the composition for forming an electrode layer. When the conductivity imparting auxiliary particles are contained, the amount of the conductivity imparting auxiliary particles contained is, for example, 0.1 to 10% by weight, preferably 1 to 10% by weight, further preferably 1 to 5% by weight. When the amount of the conductivity imparting auxiliary particles contained is in the above range, the conductivity can be satisfactorily secured, so that the effective region of the electrode is maintained, making it possible to surely obtain a capacity of the battery.

<Electrode>

The second invention of the present invention is an electrode for a lithium-ion secondary battery, which comprises a current collector, and an electrode layer being supported on one surface or both surfaces of the current collector and containing active material particles, wherein the electrode layer contains the active material particles and the binder of the invention.

The active material particles in the electrode layer generally have a particle diameter in the range of from 0.1 to 20 μm. The binder of the invention has a function such that the binder supports the active material particles on the current collector and binds together the active material particles in the electrode layer.

As the current collector, a conductive substrate is used. This may be either porous or non-porous. The conductive substrate can be formed from an electrically conductive material, for example, copper, aluminum, stainless steel, or nickel.

When the electrode is a positive electrode, the electrode layer is a mode of a positive electrode layer comprising the binder of the invention, positive electrode active material particles, and conductivity imparting auxiliary particles. The positive electrode active material particles have occluded therein and release lithium ions. Examples of active materials include various oxides, such as manganese dioxide, a lithium manganese composite oxide, a lithium-containing nickel oxide, a lithium-containing cobalt oxide, a lithium-containing nickel cobalt oxide, a lithium-containing iron oxide, and a vanadium oxide containing lithium, and chalcogen compounds, such as titanium disulfide and molybdenum disulfide.

Examples of conductivity imparting auxiliaries include acetylene black, carbon black, and graphite. With respect to the size of the conductivity imparting auxiliary particles, the particle diameter is generally 0.1 μm or less.

With respect to the amounts of the binder of the invention, positive electrode active material particles, and conductivity imparting auxiliary particles incorporated into the positive electrode, for example, the amount of the binder is 0.1 to 20% by weight, the amount of the positive electrode active material particles is 70 to 99.8% by weight, and the amount of the conductivity imparting auxiliary particles is 0.1 to 10% by weight.

When the electrode is a negative electrode, the electrode layer is a mode of a negative electrode layer comprising the binder of the invention and negative electrode active material particles. The negative electrode active material particles have occluded therein and release lithium ions. Examples of negative electrode active materials include graphite materials and carbonaceous materials, such as graphite, coke, a carbon fiber, and spherical carbon.

With respect to the amounts of the binder of the invention and negative electrode active material particles contained in the negative electrode, for example, the amount of the binder is 0.1 to 20% by weight and the amount of the negative electrode active material particles is 80 to 99.9% by weight, preferably, the amount of the binder is 2 to 20% by weight and the amount of the negative electrode active material particles is 80 to 98% by weight.

<Composition for Forming a Separator>

The invention is also a composition for forming a separator for a non-aqueous secondary battery, which contains the above-mentioned binder in an amount of 1 to 40% by weight, preferably 5 to 20% by weight, and further contains inorganic particles.

In the case where the composition contains inorganic particles, when the amount of the binder contained in the composition for forming a separator is less than 1% by weight, the fixing strength for the inorganic particles becomes unsatisfactory, causing generation of dendrite. On the other hand, when the amount of the binder contained is more than 40% by weight, passage of Li ions required for the separator is inhibited, leading to an increase of the internal resistance.

As the inorganic particles to be contained in the composition for forming a separator, for example, particles of alumina, boehmite, or magnesium hydroxide can be used, and particles of alumina are preferably used.

When the composition contains inorganic particles, the amount of the inorganic particles contained in the composition for forming a separator is, for example, 99 to 60% by weight, preferably 95 to 80% by weight. When the amount of the inorganic particles contained is in the above range, the strength of the separator is surely obtained, and the Li ion passage properties are maintained, making it possible to suppress the internal resistance.

The inorganic particles have an average particle diameter of, for example, 0.1 to 3 μm, preferably 0.1 to 1 μm. When the average particle diameter of the inorganic particles is in the above range, an appropriate path for Li ion passage can be formed, and a separator having a uniform thickness can be obtained without causing removal of the inorganic particles.

The separator formed from the above-mentioned composition for forming a separator has a porous structure in which the inorganic particles are dispersed and captured in a fine network structure comprised of a fibrid of an aromatic polyamide, and has excellent heat resistance, durability and repeated charge/discharge properties.

When a separator containing inorganic particles is formed, a dispersion of the above-mentioned composition for forming a separator in an aprotic polar solvent is used. Meanwhile, when a separator containing no inorganic particle is formed, a dispersion of the binder of the invention in an aprotic polar solvent is used.

<Separator>

The third invention of the present invention is a separator fora lithium-ion secondary battery, which comprises a substrate, and the binder of the invention present on the surface of the substrate. The binder of the invention may be present on both surfaces of the substrate, or may be present on one surface of the substrate. It is preferred that inorganic particles bound together by the binder of the invention are further present on the surface of the substrate.

The inorganic particles used in the separator are preferably comprised of an inorganic oxide from the viewpoint of the electrochemical stability. Examples of inorganic oxides include aluminum oxide, boehmite, calcined kaolin, titanium oxide, zinc oxide, and magnesium oxide.

When the inorganic particles are present on the surface of the substrate, the proportion of the weight of the inorganic particles in the whole weight of the separator including the substrate is, for example, 15 to 98% by weight from the viewpoint of suppressing the occurrence of short-circuiting and maintaining electrochemical device characteristics, such as rate characteristics.

In this case, from the viewpoint of obtaining excellent binding properties and preventing powder removal, the amount of the binder of the invention is, for example, 1 to 66 parts by weight, preferably 1 to 25 parts by weight, further preferably 4 to 20 parts by weight, relative to 100 parts by weight of the inorganic particles.

As a substrate for the separator, for example, nonwoven fabric or a porous sheet or film can be used. The material for the separator may be any material that is electrically insulating and stable to an electrochemical reaction caused inside of an electrochemical device and further stable to an electrolytic solution, and is preferably formed from an organic polymer. Examples of organic polymers include a polyolefin, a polyester, polyphenylene sulfide, a polyamide, a polyimide, a liquid crystalline polyester, and aramid. Of these, from the viewpoint of high heat resistance, handling properties, cost, and processability, preferred are a polyester and a polyolefin. Examples of polyesters include polyethylene terephthalate, and examples of polyolefins include polyethylene, polypropylene, and a polyethylene/polypropylene copolymer.

For applying the binder of the invention to the separator, a slurry having the binder of the invention dispersed in a dispersing medium is used.

When the separator having inorganic particles present on the surface thereof is obtained, the slurry containing inorganic particles is used. In the slurry, the inorganic particles are dispersed in the dispersing medium, and have an average particle diameter in the slurry of, for example, 1 to 4 μm, preferably 1.2 to 4.0 μm.

When the slurry contains inorganic particles, from the viewpoint of the viscosity and application properties of the slurry and shortening the drying step for the slurry, the amount of the inorganic particles contained in the slurry is preferably 5 to 70% by weight, further preferably 10 to 60% by weight.

As the dispersing medium, an aprotic polar solvent is used, for example, N-methylpyrrolidone, N,N-dimethylformamide, or N,N-dimethylacetamide is used. By using the above solvent, even when the inorganic particles are added to the slurry, the inorganic particles can be more uniformly and stably dispersed.

From the viewpoint of permitting the binder to more effectively exhibit binding and fixing actions, the amount of the binder of the invention contained in the slurry containing inorganic particles is, for example, 1 to 66 parts by weight, preferably 1 to 25 parts by weight, further preferably 4 to 20 parts by weight, relative to 100 parts by weight of the inorganic particles.

The amount of the binder of the invention contained in the slurry containing no inorganic particle is, for example, 5 to 70% by weight, preferably 10 to 60% by weight.

<Method for Producing a Fibrid>

The binder of the invention is used in the form of a fibrid.

The fibrid in the invention can be produced by, for example, the method shown in WO2004/099476 (JP-T-2006-525391 (the term "JP-T" as used herein means a published Japanese translation of a PCT patent application)). In this method, an NMP/$CaCl_2$ solution of a polymer is fed to a spinning nozzle through a spinning pump and subjected to jet spinning, and the polymer is coagulated using an aqueous coagulating agent to produce a fibrid. By controlling the polymer flow rate/air flow rate ratio, the length of the fibrid and the fibrillation degree can be changed. When the flow rate ratio is low, a short fibrid having a high fibrillation degree can be obtained. The obtained fibrid is recovered without being dried. If necessary, the fibrid may be further subjected to fibrillation treatment, such as a refining treatment.

Alternatively, the fibrid in the invention can be produced by the method described below. For example, a polymer is dissolved in an aprotic polar solvent containing an alkali metal salt and/or an alkaline earth metal salt in an amount of 1 to 10% by weight (for example, N-methylpyrrolidone containing calcium chloride) to prepare a polymer solution. The polymer is supplied to the polymer solution in the form of, for example, a fiber, a sheet, pellets, or a powder. The polymer concentration of the polymer solution is, for example, 0.5 to 2% by weight. The obtained polymer solution is sprayed using a spray gun (apparatus used in coating for spraying a coating composition using compressed air) against an aqueous solution containing an alkali metal salt and/or an alkaline earth metal salt in an amount of, for example, 1 to 10% by weight. The obtained fibrid is repeatedly washed and dehydrated to remove salts (such as LiCl and $CaCl_2$) contained in the polymer constituting the fibrid, and further water is removed from the fibrid. For removing water, a pressing treatment is preferred, and, for example, a pressing treatment under a pressure of 1 to 10 MPa is conducted. The fibrid obtained after the pressing treatment preferably has a fibrid concentration of 10 to 40% by weight, based on the total weight of the moisture contained and the fibrid.

Further alternatively, the fibrid in the invention can be produced by, for example, the method shown in WO2008/013247. Specifically, the fibrid can be produced by a method in which a fiber formed from a raw material polymer for a fibrid is treated using a wet precipitation apparatus composed of a combination of a stator and a rotor. The fibrid may be further treated using a defibrating machine and a refining machine. A refining treatment can be conducted by means of a refiner. As a refiner, for example, a beater, a conical refiner, a cylindrical refiner, or a double-disc refiner can be used. In the refining treatment, a change of the form of the fibrid can be monitored by the freeness test method described in the Japanese Industrial Standards P8121.

<Method for Producing a Dispersion of the Fibrid>

The fibrid which has been washed and dehydrated is dispersed in an aprotic polar solvent without being dried to obtain a dispersion. As the aprotic polar solvent, one which does not contain an alkali metal salt and/or an alkaline earth metal salt is used. Dispersing can be performed using a generally known high-speed mixer which can apply a high shear.

In the dispersion, moisture which cannot be removed by dehydration remains, and therefore the moisture in the dispersion is removed. Conditions for removing the moisture are determined depending on the aprotic polar solvent for the dispersion. For example, in the case of NMP, the moisture is removed at 80 to 130° C. for 1 to 6 hours. The concentration of the fibrid in the dispersion after removing the moisture from the dispersion is, for example, 1 to 10% by weight, preferably 2 to 5% by weight. In the dispersion, the fibrid has swollen with the aprotic polar solvent.

<Method for Producing the Electrode>

The electrode which is the second invention of the present invention can be produced by performing, in this order, the step of dispersing active material particles and the binder of the invention in a dispersing medium to prepare a slurry, the step of applying the slurry to a current collector to form a slurry coating film, and the step of drying the slurry coating film.

When the electrode is a positive electrode, the positive electrode can be produced by performing, in this order, the step of dispersing positive electrode active material particles, conductivity imparting auxiliary particles, and the binder of the invention in a dispersing medium to prepare a slurry, the step of applying the slurry to a current collector to form a slurry coating film, and the step of drying the slurry coating film.

When the electrode is a negative electrode, the negative electrode can be produced by performing, in this order, the step of dispersing negative electrode active material particles and the binder of the invention in a dispersing medium to prepare a slurry, the step of applying the slurry to a substrate to form a slurry coating film, and the step of drying the slurry coating film. After the step of drying the slurry coating film, the step of pressing the coating film under a desired pressure may be added.

In the production of both the positive electrode and the negative electrode, an aprotic polar solvent is used as the dispersing medium.

<Method for Producing the Separator>

The separator which is the third invention of the present invention can be produced by performing, in this order, the step of dispersing the binder of the invention in a dispersing medium to prepare a slurry, the step of applying the slurry to a substrate to form a slurry coating film, and the step of drying the slurry coating film.

As a method for applying the slurry to a substrate for the separator, for example, a gravure coater method, a dipping coater method, a knife coater method, or a spray coating method can be used. The slurry may be applied to only one surface of the substrate, or may be applied to both surfaces of the substrate.

When inorganic particles are further used in the slurry, the binder and the inorganic particles in the slurry are interlocked with each other and deposited on the surface of the substrate for the separator without penetrating the substrate for the separator. On the other hand, when the binder of the invention is not used but a conventional binder is used, namely, a polymer dissolved in a solvent is used, the binder penetrates the substrate for the separator to form an insulating non-porous layer in at least part of the substrate, and further powder removal occurs.

EXAMPLES

The present invention will be further described in more detail with reference to the following Examples. The evaluations were conducted by the methods described below.

(1) Solubility

In an environment at room temperature under atmospheric pressure, 20 mg of a sample and 10 ml of a solvent were placed in a transparent glass vessel (of a cylinder form having an inner diameter of 2 cm and a depth of 4 cm), and the glass vessel was vigorously shaken by hand for 10 seconds, and then allowed to stand for 24 hours while maintaining the liquid temperature at 60° C. The resultant liquid in the vessel was visually observed, and, when a liquid having no turbidity could be observed in the upper portion of the vessel, the sample was rated "Not dissolved". When the liquid in the vessel was homogeneous and a solid material was not observed in the vessel, the sample was rated "Completely dissolved". When a liquid having no turbidity could not be observed in the upper portion of the vessel and the sample was observed in the form of a swollen solid material, the sample was rated "Swell".

(2) Swelling Properties 100 ml of an NMP solution containing LiCl at a predetermined concentration was placed in a vial, and 1 g of a sample was placed in the vial so that the sample was completely immersed in the NMP solution, and the vial in that state was covered with a cap and allowed to stand under atmospheric pressure for 2 hours while maintaining the liquid temperature at 60° C. Then, the sample was taken out from the NMP solution, and examined under a digital microscope (DIGITAL MICROSCOPE VHX-900), manufactured by Keyence Corporation, at a magnification of 100 times. The examination was made with respect to 9 samples, and a single yarn diameter change ratio for each sample was calculated, and an average of the change ratio values for the 9 samples was calculated and evaluated according to the criteria shown below. The single yarn diameter change ratio is defined by the following formula.

Single yarn diameter change ratio=(Single yarn diameter after immersion−Single yarn diameter before immersion)/Single yarn diameter before immersion Swelling: A sample which maintains the fiber shape after the treatment of immersion in NMP, and which has a single yarn diameter change ratio of 20% or more.

Dispersed: A sample which maintains the fiber shape after the treatment of immersion in NMP, wherein the fiber shape has a single yarn diameter which is the same as or smaller than the single yarn diameter before the immersion treatment. It is noted that when the single yarn diameter change ratio is 20% or less, the single yarn diameter is regarded as one the same as that before the immersion treatment.

Dissolved: A sample which does not maintain the fiber shape.

(3) Preparation of a Cast Article

A sample was dispersed in salt-free NMP to obtain a dispersion having a polymer concentration of 5% by weight. The obtained dispersion was applied to a glass flat plate having a size of width: 20 mm×length: 50 mm and dried, and then immersed in water, and peeled off at an interface with the glass flat plate to prepare a sheet-form cast article.

(4) Appearance and State of a Cast Article

The appearance was visually observed and evaluated. The state was examined under a field emission scanning electron microscope Model JSM-6330F (400 times), manufactured by JEOL LTD., and evaluated.

(5) Evaluation of an Electrode

An electrode (negative electrode) was prepared in accordance with the following procedure. First, using as graphite particles C-800 (specific gravity: 1.6 g/cc; average diameter: 15 μm), manufactured by Japan Air Water Inc., a salt-free NMP dispersion (fibrid concentration: 5% by weight) of the fibrid (sample) was added to the graphite particles and the resultant mixture was dispersed and mixed using a high-speed mixer to prepare a dispersion for forming an electrode layer having the fibrid and graphite particles dispersed in NMP. With respect to the ratio of the fibrid and the graphite particles in the prepared dispersion, the amount of the fibrid was 2% by weight and the amount of the graphite particles was 98% by weight. The obtained dispersion for forming an electrode layer was applied to a copper foil (width: 20 mm×length: 50 mm) used as a current collector using a coater having a clearance of 0.3 mm, and then dried at a temperature of 105° C. for one hour to form an electrode layer, preparing an electrode (negative electrode).

(5-1) Powder Removal of an Electrode

The surface of the electrode layer of the electrode was touched by a finger, and the amount of the graphite particles deposited on the finger was evaluated according to the following criteria.

Marked: A large amount of the graphite particles are deposited when weakly touching the surface.

Slight: A small amount of the graphite particles are deposited when weakly touching the surface.

Extremely slight: No graphite particle is deposited when weakly touching the surface, and a small amount of the graphite particles are deposited when strongly touching the surface.

No: No graphite particle is deposited on the finger even when strongly touching the surface.

(5-2) Self-Supporting Properties of an Electrode

With respect to the prepared electrode, the self-supporting properties were evaluated according to the following criteria.

Having self-supporting properties: The end of the long sides of an electrode is lifted by fingers, so that the electrode can stand upright. That is, when the electrode is allowed to stand upright, the electrode layer does not collapse, and therefore the electrode can stand upright.

Self-supporting is difficult: When the end of the long sides of an electrode is lifted by fingers, the electrode cannot stand upright. That is, when the electrode is allowed to stand upright, the electrode layer collapses, and therefore the electrode cannot stand upright.

(5-3) Adhesion with a Metal Foil

With respect to the prepared electrode, the adhesion of the electrode layer with a copper foil as a current collector was evaluated according to the following criteria.

Excellent: When a 10 mm×10 mm region of the surface of the electrode layer is rubbed by a finger, the electrode layer is not peeled off.

Poor: When a 10 mm×10 mm region of the surface of the electrode layer is rubbed by a finger, the electrode layer is easily peeled off.

(5-4) Distribution of the Binder and Coverage of the Surface of Particles

The electrode layer of the prepared electrode was examined under a field emission scanning electron microscope Model JSM-6330F (400 times), manufactured by JEOL LTD., and the state was evaluated.

(6) Strength of a Cast Article of the Composition for Forming an Electrode Layer The dispersion for forming an electrode layer was applied to a glass flat plate having a size of width: 20 mm×length: 50 mm and dried, and then immersed in water, and peeled off at an interface with the glass flat plate to prepare a sheet-form cast article of the composition for forming an electrode layer. The dispersion for forming an electrode layer is as described above in (5).

The strength of the sheet-form cast article was evaluated according to the following criteria.

Weak: When one end of a sheet-form cast article is lifted, the cast article immediately collapses.

Slightly weak: When an operation in which a sheet-form cast article is wound half round a cylinder having a curvature radius of 5 mm and then straightened is repeated less than five times, the cast article does not maintain its shape and collapses.

Strong: After an operation in which a sheet-form cast article is wound half round a cylinder having a curvature radius of 5 mm and then straightened is repeated five times, the cast article maintains its shape.

(7) Average Fiber Length and Average Fiber Diameter

The measurement was made from a taken image using the function of measuring a distance between two points of Keyence microscope (DIGITAL MICROSCOPE VHX-900).

(8) Water Content of an NMP Dispersion of a Fibrid 10 g of an NMP dispersion of a fibrid was placed in a vessel and dried at 150° C. for 4 hours and then dried at 250° C. for 4 hours, and a weight of the resultant NMP dispersion was measured. From the weight reduction in this instance, a water content was calculated.

Water content=$(W_0-W)/W_0\times100$(% by weight)

wherein $W_0$ is the weight of the NMP dispersion before dried, and W is the weight of the NMP dispersion after dried.

(9) Fiber Areal Weight (g/m$^2$) of Nonwoven Fabric

A fiber areal weight was calculated from the following formula.

Fiber areal weight (g/m$^2$)=Weight (g)/Area of nonwoven fabric (m$^2$)

(10) Thickness (mm)

A thickness was measured using a thickness gauge (peacock type).

(11) Fiber Diameter (μm) of Nonwoven Fabric

Excluding 10 cm from each end of nonwoven fabric, test specimens, 1 cm square, were cut out from the respective regions of a sample each having a width of 20 cm. With respect to each test specimen, a diameter of a fiber was measured at 30 sites using a microscope, and an average of the measured values was calculated and taken as a fiber diameter of the fiber contained in the sample.

(12) Average Particle Diameter (μm) of Inorganic Particles

Distilled water was added to a slurry containing inorganic particles while stirring to control the concentration of the inorganic particles to be 0.01% by weight, and then a particle diameter was determined from a volume-based particle size distribution as measured using a laser particle size distribution measurement apparatus (SALD-2100, manufactured by Shimadzu Corporation). A particle diameter at a cumulative frequency of 50% was taken as an average particle diameter.

(13) Powder Removal of a Separator

The surface of a separator was touched by a finger, and the amount of the inorganic particles deposited on the finger was evaluated according to the following criteria.

Marked: A large amount of the inorganic particles are deposited when weakly touching the surface.

Slight: A small amount of the inorganic particles are deposited when weakly touching the surface.

Extremely slight: No inorganic particle is deposited when weakly touching the surface, and a small amount of the inorganic particles are deposited when strongly touching the surface.

No: No inorganic particle is deposited on the finger even when strongly touching the surface.

Example 1

(Preparation of a Fibrid)

As a raw material for preparing a fibrid, a fiber of a copolymerized para-aramid (fiber of a copolymerized polyparapheneneterephthalamide containing, as a copolymerized diamine component, 3,4'-oxydiphenylenediamine in an amount of 50 mol %, based on the mole of the all diamine components (Technora (registered trademark), manufactured by Teijin Limited) was used.

The above-mentioned fiber of copolymerized para-aramid was dissolved in N-methylpyrrolidone (hereinafter, referred to as "NMP") containing calcium chloride in an amount of 4% by weight to prepare a polymer solution having a polymer concentration of 1% by weight. The prepared polymer solution was sprayed against an aqueous solution containing calcium chloride in an amount of 5% by weight at a distance of 30 cm using a spray gun (apparatus used in coating for spraying a coating composition using compressed air) to obtain a fibrid which is a fibrous coagulated material. The obtained fibrid had an average fiber diameter of 0.1 μm.

(Preparation of a Dispersion of the Fibrid)

The obtained fibrid was repeatedly washed with water and dehydrated to remove salts (such as LiCl and $CaCl_2$) contained in the fibrid, and further subjected to pressing treatment under 150 MPa to remove water, obtaining a fibrid having a solids content of 25% by weight (water content: 75% by weight). The obtained fibrid was dispersed in NMP without being dried.

For removing the moisture that could not be removed by dehydration in the pressing treatment, the dispersion was allowed to stand at a temperature of 105° C. for 48 hours so that it was dried to obtain an NMP dispersion of the fibrid. The obtained NMP dispersion had a fibrid content of 2% by weight.

(Evaluation of the Solubility)

Using the above-obtained fibrid as a sample, the solubility of the sample in salt-free NMP and the solubility of the sample in NMP containing LiCl at a concentration of 1% by weight (10,000 ppm) were evaluated. The results are shown in Table 1. In Example 1, results of "Swell and not dissolved" in salt-free NMP and "Completely dissolved" in NMP containing LiCl at 1% by weight were obtained. Further, using the above-obtained fibrid as a sample, a sheet-form cast article was prepared and the appearance of the cast article was evaluated.

TABLE 1

|  | Example 1 | Comparative Example 1 | Comparative Example 2 |
| --- | --- | --- | --- |
| Type of polymer | Copolymerized para-aramid (3,4'-oxydiphenylene-diamine copolymerized para-aramid) | Meta-aramid (Polymetaphenylene-isophthalamide) | Para-aramid (Polyparaphenylene-terephthalamide) |
| Solubility of fibrid (polymer) in salt-free NMP | Swell and not dissolved | Completely dissolved | Not dissolved |
| Solubility of fibrid (polymer) in NMP containing LiCl at 1% by weight | Completely dissolved | Completely dissolved | Not dissolved |
| Appearance of sheet-form cast article of salt-free NMP dispersion (solution) | Film form in which the fiber shape remains | Uniform film form | Paper form in which the shape formed by fibers interlocked is maintained |

(Preparation of an Electrode)

Using the above-obtained fibrid as a sample, a dispersion for forming an electrode layer was prepared, and an electrode was prepared. The results of the evaluation are shown in Table 2. Further, for the purpose of observing the distribution of the graphite particles and the binder in the electrode layer of the electrode, a sheet-form cast article was prepared using the components of the dispersion for forming an electrode layer (composition for forming an electrode layer) and evaluated. The results are shown in Table 2. The state of the cast article in salt-free NMP was visually evaluated.

TABLE 2

|  | Example 1 | Comparative Example 1 | Comparative Example 2 |
|---|---|---|---|
| Type of polymer | Copolymerized para-aramid (3,4'-oxydiphenylene-diamine copolymerized) | Meta-aramid (Polymetaphenylene-isophthalamide) | Para-aramid (Polyparaphenylene-terephthalamide) |
| Self-supporting properties of electrode | Having self-supporting properties | Having self-supporting properties | Self-supporting is difficult |
| Adhesion with metal foil | Excellent | Excellent | Poor |
| Powder removal of electrode | Extremely slight | No | Marked |
| State of cast article of composition for forming electrode layer | Particles are included in three-dimensional network structure of fiber | Uniform film | Particles are included in three-dimensional network structure of fiber |
| Distribution of binder in cast article of composition for forming electrode layer | Uniform | Surface of particles is covered by binder, Binder is unevenly distributed between particles | Uniform |
| Coverage of surface of graphite particles in cast article of composition for forming electrode layer | No | Occurred | No |
| State of cast article of composition for forming electrode layer in salt-free NMP | Partially swell Not dissolved | Dissolved | Not swell Not dissolved |

(Evaluation of the Strength of an Electrode Layer)

For evaluating the strength of an electrode layer, using the above-obtained fibrid as a sample, a sheet-form cast article was prepared and evaluated in respect of a strength. The results are shown in Table 3.

TABLE 3

|  | Example 1 | Comparative Example 1 | Comparative Example 2 |
|---|---|---|---|
| Type of polymer | Copolymerized para-aramid (3,4'-oxydiphenylene-diamine copolymerized) | Meta-aramid (Polymetaphenylene-isophthalamide) | Para-aramid (Polyparaphenylene-terephthalamide) |
| Strength of cast article of composition for forming electrode | Strong | Strong | Strong |

(Dispersion of the Fibrid in the Case where the LiCl Concentration is Changed)

With respect to the respective cases in which the LiCl concentrations of NMP are 0 ppm, 10 ppm, 100 ppm, 1,000 ppm, 5,000 ppm, and 10,000 ppm, the state of the dispersion of the fibrid in Example 1 was examined. The results are shown in Table 4. The "St" indicates the viscosity of NMP.

TABLE 4

| LiCl Concentration of NMP (ppm) | Color | Viscosity | State of fibrid in NMP |
|---|---|---|---|
| 0 | Reddish brown, Milky brown | St | Fibrid |
| 10 | Yellow, Opaque white | Equivalent to St | Fibrid |
| 100 | Yellow, Opaque white | Equivalent to St | Fibrid |
| 1,000 | Yellow, Opaque white | Slightly thickened | Fibrid, Dissolution partially starts |
| 5,000 | Yellow, Opaque white | Thickened | Fibrid, Partially dissolved |
| 10,000 | Yellow, Translucent | Markedly thickened | Dissolved |

(Evaluation of Swelling Properties in the Case where the LiCl Concentration is Changed)

With respect to the respective cases in which the LiCl concentrations of NMP are 0 ppm, 10 ppm, 100 ppm, 1,000 ppm, 5,000 ppm, and 10,000 ppm, the swelling properties of the raw material polymer for fibrid were evaluated. The results are shown in Table 5. The fiber of copolymerized para-aramid in Example 1 was used as a sample.

TABLE 5

| Immersion liquid | | Single yarn diameter (μm) Single yarn sample No. | | | | | | | | | Average (%) of single yarn diameter | Swelling |
| --- | --- | --- | --- | --- | --- | --- | --- | --- | --- | --- | --- | --- |
| Solvent | LiCl Concentration (ppm) | 1 | 2 | 3 | 4 | 5 | 6 | 7 | 8 | 9 | change ratio | properties |
| None | — | 41 | 33 | 39 | 37 | 42 | 39 | 44 | 42 | 39 | | |
| Water | 0 | 41 | 33 | 39 | 37 | 42 | 39 | 44 | 42 | 39 | 0 | No change |
| NMP | 0 | 71 | 90 | 109 | 109 | 81 | 81 | 96 | 92 | 87 | 138 | Swell |
| | 10 | 114 | 113 | 111 | 115 | 111 | 109 | 109 | 124 | 114 | 192 | Swell |
| | 100 | 108 | 102 | 103 | 105 | 90 | 109 | 111 | 112 | 112 | 173 | Swell |
| | 500 | 98 | 92 | 106 | 119 | 122 | 109 | 102 | 130 | 130 | 193 | Swell |
| | 1,000 | The fiber shape is indefinite, so that the measurement of single yarn diameter cannot be made. | | | | | | | | | — | Swell or dissolved |
| | 10,000 | — | — | — | — | — | — | — | — | — | — | Dissolved |
| | 20,000 | — | — | — | — | — | — | — | — | — | — | Dissolved |

Reference Example 1

Using an N,N-dimethylacetamide (hereinafter, referred to as "DMAc") solution of polymetaphenyleneisophthalamide (polymer IV 1.25; polymer concentration of the solution: 20% by weight) as a spinning stock solution, spinning was conducted by discharging the stock solution from a spinning nozzle having 1,500 holes having a hole diameter of 0.07 mm into a coagulation bath having a bath temperature of 20° C. and a length of 5 m. The coagulation liquid had a composition of DMAc/water (mass ratio)=55/45, and spinning was conducted by discharging the stock solution into the coagulation bath at a yarn speed of 5 m/minute (coagulation time: 60 seconds). Subsequently, plasticization stretching was conducted at a degree of stretching of 7.0 times in a plasticization stretching bath having a temperature of 40° C. and a composition of DMAc/water=60/40. After the plasticization stretching, the resultant fiber was satisfactorily washed successively through a bath of DMAc/water=30/70 at 20° C. (immersion length: 1.8 m), and subsequently a water bath at 20° C. (immersion length: 3.6 m) and a water bath at 60° C. (immersion length: 5.4 m) and further a water bath at 80° C. (immersion length: 7.2 m). After the washing, the resultant fiber was taken and subjected to air drying to obtain a sample in Reference Example 1. The swelling properties of the sample were evaluated. The results are shown in Table 6.

The obtained fiber of polymetaphenyleneisophthalamide was dissolved in an NMP solvent, and was dissolved also in an NMP solvent in which an alkali metal salt and/or an alkaline earth metal salt was present at a concentration of 1,000 ppm or less.

TABLE 6

| Immersion liquid | | Single yarn diameter (μm) Single yarn sample No. | | | | | | | | | Average (%) of single yarn diameter | Swelling |
| --- | --- | --- | --- | --- | --- | --- | --- | --- | --- | --- | --- | --- |
| Solvent | LiCl Concentration (ppm) | 1 | 2 | 3 | 4 | 5 | 6 | 7 | 8 | 9 | change ratio | properties |
| None | — | 30 | 18 | 21 | 16 | 18 | 24 | 17 | 23 | 17 | | |
| Water | 0 | 30 | 18 | 21 | 16 | 18 | 24 | 17 | 23 | 17 | 0 | No change |
| NMP | 0 | — | — | — | — | — | — | — | — | — | — | Dissolved |
| | 10 | — | — | — | — | — | — | — | — | — | — | Dissolved |
| | 100 | — | — | — | — | — | — | — | — | — | — | Dissolved |
| | 500 | — | — | — | — | — | — | — | — | — | — | Dissolved |
| | 1,000 | — | — | — | — | — | — | — | — | — | — | Dissolved |
| | 10,000 | — | — | — | — | — | — | — | — | — | — | Dissolved |
| | 20,000 | — | — | — | — | — | — | — | — | — | — | Dissolved |

Reference Example 2

With respect to the fiber obtained after the washing using the water bath in Reference Example 1, the fiber was not subjected to air drying but subjected to dry heat treatment under a constant tension using a heated roller at a surface temperature of 150° C. Subsequently, a heat treatment step was performed in which the fiber was stretched at a stretching degree of 1.5 times while subjecting it to heat treatment using a heated roller at a surface temperature of 335° C., obtaining a heat-treated fiber of polymetaphenyleneisophthalamide. The obtained heat-treated fiber was taken as a sample in Reference Example 2. The swelling properties of the sample were evaluated. The results are shown in Table 7.

The obtained heat-treated fiber of polymetaphenyleneisophthalamide did not swell in an NMP solvent, and did not either swell in an NMP solvent in which an alkali metal salt and/or an alkaline earth metal salt was present at a concentration of 1,000 ppm or less.

Comparative Example 2

An NMP dispersion of a fibrid was prepared in substantially the same manner as in Example 1 except that, instead of the fibrid in Example 1, a fibrid of a para-aramid (polyparaphenyleneterephthalamide containing no copolymerized component) (Twaron jet spun fibrid JSF8016, manufactured by Teijin Aramid B.V.) was used.

The solubility of the fibrid in salt-free NMP and the solubility of the fibrid in NMP containing LiCl at 1% by weight are shown in Table 1.

In Comparative Example 2, results of "Not dissolved" in salt-free NMP and "Not dissolved" in NMP containing LiCl at 1% by weight were obtained.

Using the obtained NMP dispersion, a sheet-form cast article was prepared and evaluated in the same manner as in Example 1. The results are shown in Table 1.

Further, an electrode was prepared and evaluated in the same manner as in Example 1. The results are shown in Table 2.

TABLE 7

| | | Immersion liquid | | | | | | | | | |
|---|---|---|---|---|---|---|---|---|---|---|---|
| | LiCl | Single yarn diameter (μm) | | | | | | | | Average (%) of | |
| | Concen- | Single yarn sample No. | | | | | | | | single yarn diameter | Swelling |
| Solvent | tration (ppm) | 1 | 2 | 3 | 4 | 5 | 6 | 7 | 8 | 9 | change ratio | properties |
| None | — | 24 | 24 | 19 | 21 | 21 | 21 | 17 | 22 | 21 | | |
| Water | 0 | 24 | 24 | 19 | 21 | 21 | 21 | 17 | 22 | 21 | 0 | No change |
| NMP | 0 | 21 | 17 | 18 | 16 | 17 | 19 | 24 | 14 | 17 | −11 | No change |
| | 10 | 18 | 24 | 17 | 14 | 19 | 15 | 19 | 22 | 21 | −11 | No change |
| | 100 | 12 | 18 | 21 | 17 | 17 | 12 | 16 | 23 | 15 | −18 | No change |
| | 500 | 19 | 15 | 13 | 14 | 14 | 18 | 11 | 18 | 15 | −26 | No change |
| | 1,000 | 17 | 18 | 16 | 18 | 16 | 19 | 18 | 18 | 20 | −15 | No change |
| | 10,000 | — | — | — | — | — | — | — | — | — | — | Dissolved |
| | 20,000 | — | — | — | — | — | — | — | — | — | — | Dissolved |

Comparative Example 1

An NMP solution was prepared in substantially the same manner as in Example 1 except that, instead of the fibrid in Example 1, the fiber obtained in Reference Example 1 (fiber obtained after air drying) was used. In this instance, the fiber was dissolved, and hence a dispersion was not formed but a solution was obtained. The solubility of the fiber (fiber obtained in Reference Example 1) in salt-free NMP and the solubility of the fiber in NMP containing LiCl at 1% by weight are shown in Table 1.

In Comparative Example 1, results of "Completely dissolved" in salt-free NMP and "Completely dissolved" in NMP containing LiCl at 1% by weight were obtained.

Using the obtained NMP solution, a sheet-form cast article was prepared and evaluated in the same manner as in Example 1. The results are shown in Table 1.

Further, an electrode was prepared and evaluated in the same manner as in Example 1. The results are shown in Table 2.

Examples 2, 3 and 4

Using the fibrid and graphite particles in Example 1, an electrode was prepared. In this instance, a sheet-form cast article and an electrode were prepared and evaluated in substantially the same manner as in Example 1 except that the amounts of the fibrid and the graphite particles were changed as shown in Table 8. The results are shown in Table 8.

Comparative Examples 3 and 4

Using the fibrid and graphite particles in Example 1, an electrode was prepared. In this instance, a sheet-form cast article and an electrode were prepared and evaluated in substantially the same manner as in Example 1 except that NMP was not used but water was used as a dispersing medium, and that the amounts of the fibrid and the graphite particles were changed as shown in Table 8. The results are shown in Table 8.

TABLE 8

| | Example 2 | Example 3 | Example 4 | Comparative Example 3 | Comparative Example 4 |
|---|---|---|---|---|---|
| Dispersing medium | NMP | NMP | NMP | Water | Water |
| Fibrid (% by weight) | 5 | 2 | 1 | 10 | 5 |
| Graphite particles (% by weight) | 95 | 98 | 99 | 90 | 95 |
| Powder removal | No | Extremely slight | Slight | Slight | Marked |
| Strength of cast article | Strong | Strong | Slightly weak | Weak | Weak |

Example 5

(Preparation of a Positive Electrode)

First, to 90% by weight of a lithium cobalt oxide ($Li_xCoO_2$, wherein X is more than 0 to 1) powder are added 5% by weight of acetylene black and 5% by weight of a dimethylformamide (DMF) solution of the fibrid obtained in Example 1 as a binder, and they are mixed with each other to prepare a slurry. The prepared slurry is applied to both surfaces of a current collector formed from an aluminum foil having a thickness of 15 μm, and then dried and pressed to prepare a positive electrode having a structure in which a positive electrode layer is supported on both surfaces of the current collector. The positive electrode layer has a thickness of 60 μm per one surface and a width of 55 mm.

Example 6

(Preparation of a Negative Electrode)

95% by weight of a graphite powder as a carbonaceous material and 5% by weight of a dimethylformamide (DMF) solution of the fibrid obtained in Example 1 as a binder are mixed with each other to prepare a slurry. The prepared slurry is applied to both surfaces of a current collector formed from a copper foil having a thickness of 12 μm, and dried and pressed to prepare a negative electrode having a structure in which a negative electrode layer is supported on the current collector. The negative electrode layer has a thickness of 55 μm per one surface and a width of 58 mm.

Example 7

(Preparation of a Separator)

89 Parts by weight of calcined kaolin (average particle diameter: 0.8 μm) as inorganic particles, 10 parts by weight of the fibrid obtained in Example 1 as a binder, 1 part by weight of a polyoxyalkylene surfactant (trade name "SN WET 980", manufactured by Sannopco Co., Ltd.), and 150 parts by weight of water are placed in a container of NBK-1 (trade name, manufactured by NISSEI Corporation) which is a non-bubbling kneader, and subjected to dispersion treatment under conditions such that the number of revolutions is 1,500 rpm and the dispersion treatment time is 5 minutes to obtain a uniform slurry. The inorganic particles in the obtained slurry have an average particle diameter of 1.91 μm.

In the obtained slurry is dipped nonwoven fabric made of polyethylene terephthalate having a laminated structure of nonwoven fabric layer prepared by a spun bond method (fiber diameter: 12 μm)/nonwoven fabric layer prepared by a melt blown method (fiber diameter: 1.7 μm)/nonwoven fabric layer prepared by a spun bond method (fiber diameter: 12 μm), so that the slurry is applied to the nonwoven fabric by dip coating. Then, the resultant nonwoven fabric is passed through a gap having a predetermined space, and further dried in an oven at 80° C. to remove the solvent, obtaining a separator.

INDUSTRIAL APPLICABILITY

The binder of the present invention can be advantageously used as a binder for use in forming an electrode layer of an electrode for a lithium-ion secondary battery or a separator for a lithium-ion secondary battery.

The invention claimed is:

1. A binder for a non-aqueous secondary battery, the binder comprising a fibrid of an aromatic polyamide, wherein the fibrid swells and is not dissolved in an N-methyl-2-pyrrolidone solvent in which an alkali metal salt and/or an alkaline earth metal salt is present at a concentration of 1,000 ppm or less, and is completely dissolved in an N-methyl-2-pyrrolidone solvent in which an alkali metal salt and/or an alkaline earth metal salt is present at a concentration of 10,000 ppm or more,
wherein the aromatic polyamide is a copolymerized polyparaphenyleneterephthalamide,
wherein the copolymerized polyparaphenyleneterephthalamide is a copolymer having a paraphenyleneterephthalamide structure in the polymer chain thereof and having 3,4'-oxydiphenylenediamine or 4,4'-oxydiphenylenediamine copolymerized as a copolymerized diamine component, wherein the proportion of 3,4'-oxydiphenylenediamine or 4,4-oxydiphenylenediamine in the all diamine components is 25 to 75 mol %.

2. The binder according to claim 1, wherein the copolymerized polyparaphenyleneterephthalamide is a copolymer having a paraphenyleneterephthalamide structure in the polymer chain thereof and having 3,4'-oxydiphenylenediamine copolymerized as a copolymerized diamine component.

3. The binder according to claim 1, wherein the fibrid has an average fiber diameter of 10 nm to 1,000 nm.

4. A dispersion having the binder according to claim 1 dispersed in an aprotic polar solvent.

5. The dispersion according to claim 4, wherein the fibrid in the binder has swollen with the aprotic polar solvent.

6. A composition for forming an electrode layer for a non-aqueous secondary battery, the composition containing the binder according to claim 1 in an amount of 0.1 to 20% by weight based on the total weight of the composition, and further containing active material particles and conductivity imparting auxiliary particles.

7. An electrode for a lithium-ion secondary battery, comprising a current collector, and an electrode layer being supported on one surface or both surfaces of the current collector and containing active material particles, wherein the electrode layer contains the active material particles and the binder according to claim 1.

8. A method for producing an electrode for a lithium-ion secondary battery, comprising, in this order, the step of dispersing inorganic particles and the binder according to claim 1 in a dispersing medium to prepare a slurry, the step of applying the slurry to a substrate to form a slurry coating film, and the step of drying the slurry coating film.

9. A composition for forming a separator for a non-aqueous secondary battery, the composition containing the binder according to claim 1 in an amount of 1 to 40% by weight, and further containing inorganic particles.

10. A separator for a lithium-ion secondary battery, comprising a substrate, and the binder according to claim 1 present on the surface of the substrate.

11. The separator for a lithium-ion secondary battery according to claim 10, which further comprises inorganic particles present on the surface of the substrate.

12. A method for producing a separator for a lithium-ion secondary battery, comprising, in this order, the step of dispersing the binder according to claim 1 in a dispersing medium to prepare a slurry, the step of applying the slurry to a substrate for a separator to form a slurry coating film, and the step of drying the slurry coating film.

\* \* \* \* \*